(12) United States Patent
Enayati

(10) Patent No.: US 8,739,558 B2
(45) Date of Patent: Jun. 3, 2014

(54) AUTOMATIC COLD AND HOT AIR CONDITIONER SYSTEM

(76) Inventor: Payman Enayati, Tehran (IR)

( * ) Notice: Subject to any disclaimer, the term of this patent is extended or adjusted under 35 U.S.C. 154(b) by 819 days.

(21) Appl. No.: 12/857,584

(22) Filed: Aug. 17, 2010

(65) Prior Publication Data
US 2010/0326091 A1    Dec. 30, 2010

(51) Int. Cl.
F24F 3/16 (2006.01)
F25D 23/12 (2006.01)
F25B 21/02 (2006.01)
F25D 3/00 (2006.01)

(52) U.S. Cl.
USPC .................... 62/78; 62/259.4; 62/3.4; 62/389

(58) Field of Classification Search
USPC ......... 62/3.4, 150, 171, 304, 305, 176.6, 3.64
See application file for complete search history.

(56) References Cited

U.S. PATENT DOCUMENTS

| | | | |
|---|---|---|---|
| 2003/0161104 A1* | 8/2003 | Hartzell et al. | 361/699 |
| 2004/0074251 A1* | 4/2004 | Shahbaz | 62/305 |
| 2006/0037330 A1* | 2/2006 | Weigl | 62/78 |
| 2007/0056299 A1* | 3/2007 | Shankweiler | 62/157 |
| 2008/0028768 A1* | 2/2008 | Goenka | 62/3.2 |
| 2009/0230202 A1* | 9/2009 | Matsui et al. | 236/44 A |
| 2011/0048982 A1* | 3/2011 | Hurt et al. | 206/223 |

* cited by examiner

Primary Examiner — Judy Swann
Assistant Examiner — Zachary R Anderegg
(74) Attorney, Agent, or Firm — Barry Choobin; Patent 360 LLC (57) ABSTRACT

The various embodiments herein provide an air conditioner system for providing cold and warm air in cars and buildings. The air conditioner system includes a chamber, a plurality of input air blades, a plurality of input air filters, an electrical ventilator, one or more wet heat exchangers, and one or more dry heat exchangers installed in the chamber, an outgoing air heat exchanger, an operation selection valve, an electrical circulating pump, one or more sets of water sprayers nozzles, one or more water sprayer pumps, one or more thermoelectric modules and a microcontroller unit. The passing of air through the chamber is automatically controlled by the microcontroller unit based on the operation of the system in the cooling or heating mode. The air is cooled in the cooling mode using the multistage water evaporation mechanism.

15 Claims, 3 Drawing Sheets

AUTOMATIC COLD AND HOT AIR CONDITIONER SYSTEM

BACKGROUND

1. Technical Field

The embodiments herein generally relate to an air conditioner system and particularly relates to an air conditioner system providing cold and warm air in automobiles and buildings. The embodiments herein more particularly relate to the air conditioner system that is controlled by one or more sensors, one or more actuators and a microcontroller to create cold and warm air.

2. Description of the Related Art

The air conditioner systems are widely used for conditioning air and are available in various designs and configurations for the purpose of cooling houses, buildings and vehicles.

In the existing technique, various types of coolers are used instead of the air conditioner systems for cooling. The various types of coolers that are used for cooling are water evaporation type cooler, gas evaporation type cooler and absorption chiller type coolers. The water evaporation type coolers that are currently used have several drawbacks. The drawbacks are that the water evaporation type cooler increases the relative humidity of conditioned air and is unusable in humid and sultry climates. Further the water evaporation type coolers consume more water for the operation and the microorganisms, fungus and bacteria are accumulated on the evaporation panels during the operation.

The gas evaporation type cooler have various drawbacks in the existing technique. The drawbacks of the exiting gas evaporation type coolers which are used in houses and buildings are the high consumption of electrical energy for operation. The gas evaporation type coolers which are used in cars and vehicles consumes more fuel for the operation and reduces the performance of the engine in the vehicles which in turn increases the temperature of the engine and decreases the torque. Further, the usage of gas evaporation type coolers causes environmental pollution and damages the ozone layer due to the leakage of evaporative refrigerant gases.

Further, in the existing technique, there are various drawbacks associated with the water-air heating and cooling systems such as absorption chillers. Moreover the water-air heating and cooling systems require an installation of the water pipes in the buildings for the operation. The probability of water leakage in the water-air heating and cooling systems is high and also requires a high cost for the maintenance of the pipes and instruments. The water-air heating and cooling systems also require a large space for installations.

The abovementioned shortcomings, disadvantages and problems are addressed herein and which will be understood by reading and studying the following specification.

OBJECTS OF THE EMBODIMENTS

The primary object of the embodiments herein is to provide a computer controlled air conditioner system that provides cold and warm air in cars and buildings.

Another object of the embodiments herein is to provide the automatic air conditioner system that operates in the cooling mode and the heating mode based on the received input medium.

Yet another object of the embodiments herein is to provide the automatic air conditioner system with a microcontroller unit so that the microcontroller unit in the air conditioner system measures incoming and outgoing air temperature and their relative humidity, water-ethylene glycol solution temperature, the temperature of hot and cold surfaces of thermoelectric plates to adjust the working conditions of the air conditioner.

Yet another object of the embodiments herein is to provide the air conditioner system that manages and decreases the usage of water and minimizes energy consumption.

Yet another object of the embodiments herein is to provide the low cost cold/warm air conditioner system that is suitable for use in buildings, cars, vehicles and camps.

Yet another object of the embodiments herein is to provide a green and low cost air conditioner system by minimizing the consumption of water and energy.

Yet another object of the embodiments herein is to provide a green and low cost air conditioner system by decreasing the fuel consumption of cars and vehicles and decreasing the environment pollution.

Yet another object of the embodiments herein is to provide the green air conditioner system by omitting the refrigerant gases and decreasing the environment pollution.

Yet another object of the embodiments herein is to provide the air conditioner system with a low cost of maintenance.

Yet another object of the embodiments herein is to provide the air conditioner system that can be used in cars and vehicles even when the engine is switched off.

Yet another object of the embodiments is to provide the air conditioner system that provides cold drinking water in cars, vehicles and camps.

Yet another object of the embodiments herein is to provide the air conditioner system with automatic adjustment of either cooling or heating functions.

Yet another object of the embodiments herein is to provide an air conditioner system with automatic adjustment of temperature and relative humidity for optimum system performance.

Yet another object of the embodiments herein is to provide an air conditioner system with compact design and consumes low space for installation.

Yet another object of the embodiments to provide an air conditioner system with a controller to provide real time, closed loop feedback controlling of cooling, heating, humidifying and dehumidifying components and systems to minimize water and energy consumption for the operation.

Yet another object of the embodiments to provide an air conditioner system which deodorizes and disinfects the conditioned air.

These and other objects and advantages of the present invention will become readily apparent from the following detailed description taken in conjunction with the accompanying drawings.

SUMMARY

The various embodiments herein provide an air conditioner system for providing cold and warm air in cars and buildings. The air conditioner system includes a chamber, a plurality of input air blades, a plurality of input air filters, an electrical ventilator, one or more wet heat exchangers, and one or more dry heat exchangers installed in the chamber, an outgoing air heat exchanger, a cold/warm operation selection valve, an electrical circulation pump, one or more sets of water sprayer nozzles, one or more water sprayer pumps, one or more thermoelectric modules, one cold drinking water dispenser pump, one cold drinking water circulating pump, one deodorizer and disinfector spray system and a microcontroller unit. The working of all above mentioned components and actuators are automatically controlled by the microcontroller unit based on the operation of the system in a cooling or heating mode. In the cooling mode, the air is cooled by using the multistage water evaporation mechanism.

According to one embodiment herein, the air conditioner system utilizes a liquid present in the pipes of the heat exchangers as a medium for operation.

According to one embodiment herein, the plurality of input air filters is made up of nano-silver and active carbon materials.

According to one embodiment herein, the air passed into the air conditioner system is pre-cooled in the first stage of the multistage water evaporation mechanism. In this stage, the water which is evaporated over pipes and fins of wet heat exchanger cools the water—ethylene glycol solution that is circulated in pipes of the wet and dry heat exchangers. This cold solution cools the air which is passed through pipes and fins of dry heat exchanger.

According to one embodiment herein, the air passed into the air conditioner system is cooled by the water that is evaporated over pipes and fins of the wet heat exchangers in the second stage of the multistage water evaporation mechanism.

According to one embodiment herein, the air passed into the air conditioner system is cooled by the electrical energy that is consumed in the thermoelectric module in a third stage of the multistage cooling mechanism.

According to one embodiment herein, the air passed into the air conditioner system is cooled by water drops that entrap and evaporate over the pipes and fins of the outgoing air heat exchanger in fourth stage of the multistage water evaporation mechanism.

According to one embodiment herein, the operation selection valve changes a path of circulating water-ethylene glycol solution flow based on the operation of air conditioner system in either of the cooling mode or the heating mode.

According to one embodiment herein, the thermoelectric module pumps heat from internal space of the chamber to the outside.

According to one embodiment herein, the thermoelectric module dehumidifies conditioned air and recycles a portion of evaporated water over wet heat exchanger.

According to one embodiment herein, the microcontroller unit comprises one or more preset values for temperature and relative humidity set by a user.

According to one embodiment herein, the air conditioner system includes at least one temperature sensors and relative humidity sensors.

According to one embodiment herein, the temperature sensors measures the temperature of input air, output air, internal plates and external plates of the thermoelectric modules and the temperature of the water circulating in the air conditioner system.

According to one embodiment herein, the relative humidity sensors measure the relative humidity of input air and output air.

According to one embodiment herein, a solution circulating pump circulates water-ethylene glycol solution in a closed circuit through the one or more dry heat exchangers and the one or more wet heat exchangers, when the air conditioning system is in the cooling mode.

According to one embodiment herein, the operation selection valve conducts the water-ethylene glycol solution to the path that is heated through an external heating source during a heating mode operation.

According to one embodiment, herein, the microcontroller unit turns on the electrical spraying pumps and sprays the water over the wet heat exchangers in regular intervals based on the preset values for temperature and relative humidity set by the user during a cooling mode operation.

According to one embodiment herein, the operation of the air-conditioned system is selected automatically based on the temperature of the input air.

According to one embodiment herein, the one or more wet heat exchangers are made up of one or more metals with high thermal conductivity coefficient.

According to one embodiment herein, the one or more dry heat exchangers are made of one or more metals with high thermal conductivity coefficient.

According to one embodiment herein, one deodorizer and disinfector spraying system, deodorizes and disinfects the conditioned air.

According to one embodiment herein, in cooling mode operation of air conditioner system, one drinking water circulation pump circulates and cools drinking water in a closed circuit through outgoing air heat exchanger and drinking water tank.

According to one embodiment herein, in cooling mode operation of air conditioner system, one drinking water dispenser pump delivers cold water to user through drinking water dispenser nozzle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments herein are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the disclosure herein provide an air conditioner system for providing cold and warm air in cars and buildings. The air conditioner system includes a chamber, a plurality of input air blades, a plurality of input air filters, an electrical ventilator, one or more wet heat exchangers and one or more dry heat exchangers installed in the chamber, an outgoing air heat exchanger, a cold/warm operation selection valve, an electrical circulation pump, one or more sets of water sprayer nozzles, one or more water sprayer pumps, one or more thermoelectric modules, one cold drinking water dispenser pump, one cold drinking water circulating pump, one deodorizer and disinfector spray system and a microcontroller unit. The working of all above mentioned components and actuators are automatically controlled by the microcontroller unit based on the operation of the system in a cooling or heating mode. In the cooling mode, the air is cooled by using the multistage water evaporation mechanism.

Figure 1:
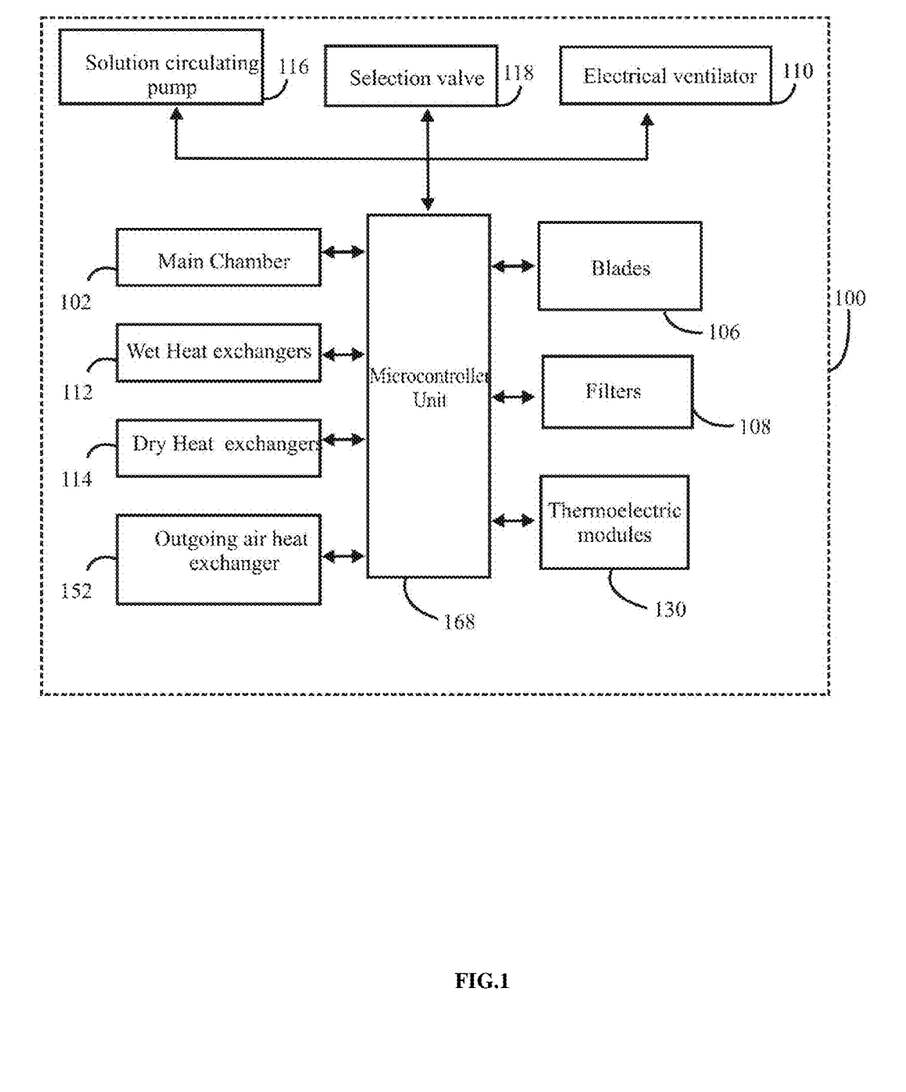
FIG. 1 illustrates a block diagram of the air conditioner system according to one embodiment.

FIG. 1 illustrates a block diagram of the air conditioner system according to one embodiment. The air conditioner system 100 includes a chamber 102, a plurality of input air blades 106, a plurality of input air filters 108, an electrical ventilator 110, one or more wet heat exchangers 112, one or more dry heat exchangers 114, one main water tank 124, one or more water spraying pumps 122, one or more spraying water filters 128, one or more sets of spraying water nozzles 120, a solution circulating pump 116, an operation selection valve 118, one deodorizer actuator 142, one or more thermoelectric modules 130, one or more thermoelectric modules heat sink fan 134, one thermoelectric modules sweeping blade motor 140, an outgoing air heat exchanger 152, a drinking water tank 154, one drinking water circulating pump 156, one drinking water dispenser pump 158 and a microcontroller unit 168.

The chamber 102 holds the one or more components of the air conditioner system 100 and the incoming air is conditioned while passing through the chamber 102. The plurality of input air blades 106 prevents the entering of large external particles into the chamber 102 and also prevents scattering of excessive water from the one or more wet heat exchangers 112 which drops in to lower tray 104. The main electrical ventilator 110 sucks incoming air into the chamber 102 and vents the conditioned air through the outgoing air heat exchanger 152. The one or more wet heat exchangers 112 cools the air by an evaporation of the sprayed water on the fins and also cools the water-ethylene glycol solution that is passed through the narrow pipes of the one or more wet heat exchangers 112.

The one or more dry heat exchangers 114 cools the incoming air by heat exchanging heat between the passing air and the water ethylene glycol solution which is cooled in the one or more wet heat exchangers 112. The solution circulating pump 116 circulates the water-ethylene glycol solution through the wet heat exchangers 112 and the dry heat exchangers 114 in the cooling mode of air conditioning.

The operation selection valve 118 selects the cooling or heating mode of the air conditioner system 100 by changing the path of water-ethylene glycol solution. The conditioned air in the dry heat exchangers 114 and the wet heat exchangers 112 cools more during passing and striking to one or more thermoelectric modules 130 and also dehumidifies the air and recycles the water which evaporates on the wet heat exchangers 112.

Figure 2:
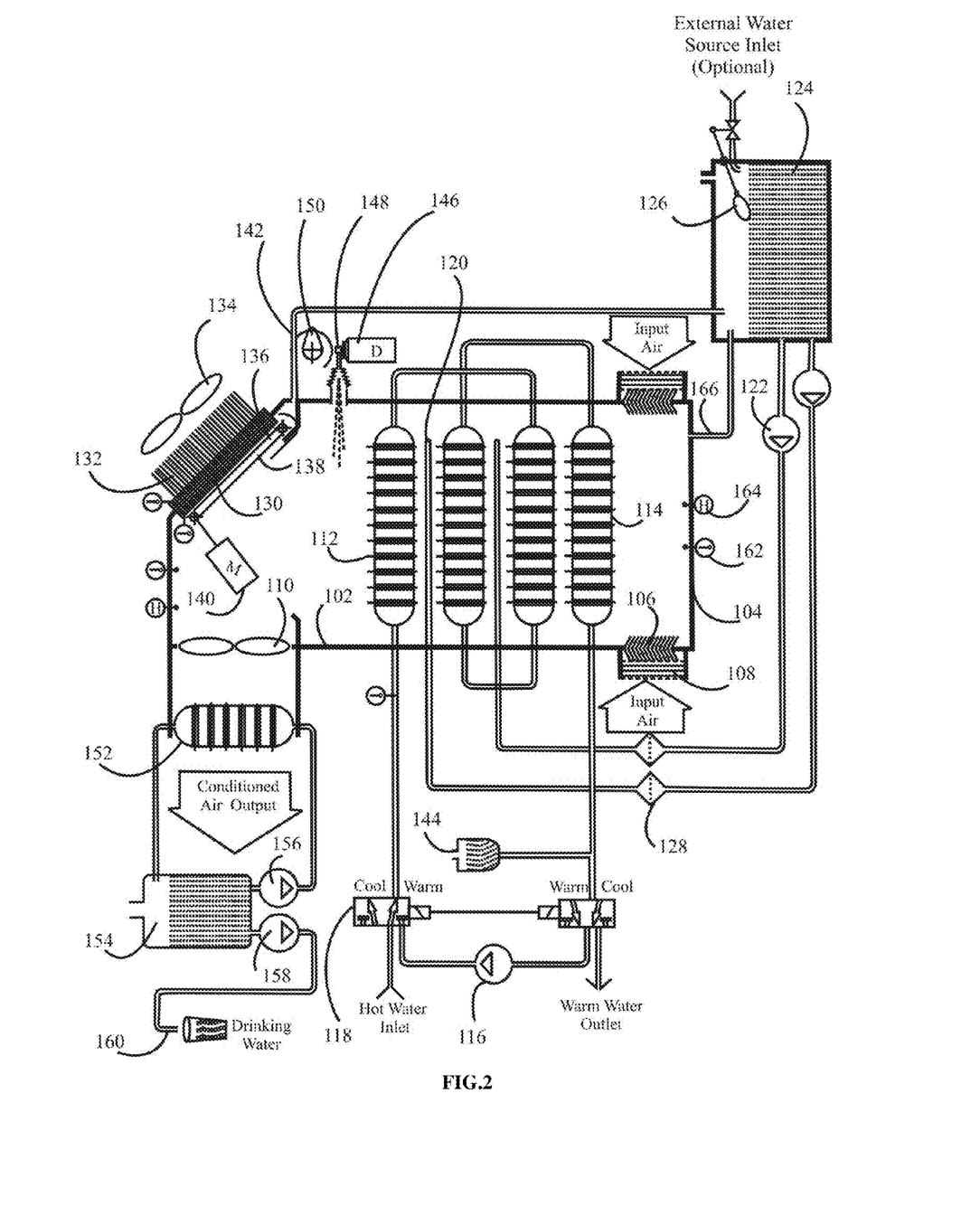
FIG. 2 illustrates a schematic diagram of the air conditioner system operating in cooling mode according to one embodiment.
Figure 3:
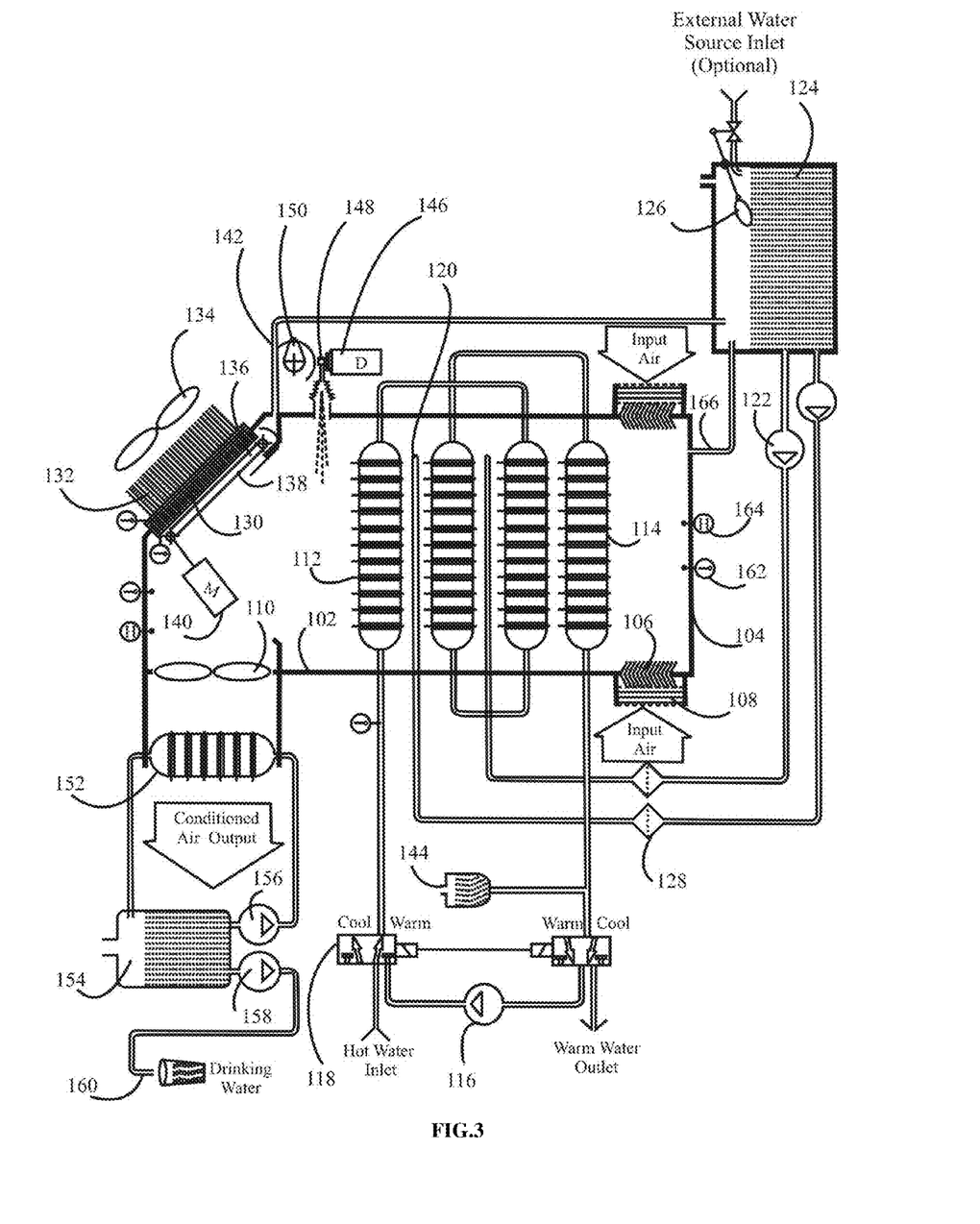
FIG. 3 illustrates a schematic diagram of the air conditioner system operating in heating mode according to one embodiment.

FIG. 2 illustrates a schematic diagram of the air conditioner system operating in cooling mode according to one embodiment. FIG. 3 illustrates a schematic diagram of the air conditioner system operating in heating mode according to one embodiment. With respect to FIG. 2 and FIG. 3, the air conditioner system includes the chamber 102, a lower tray 104, the plurality of input air blades 106, the plurality of input air filters 108, the main electrical ventilator 110, the one or more wet heat exchangers 112, the one or more dry heat exchangers 114, the solution circulating pump 116, the operation selection valve 118, one or more sets of water sprayers nozzles 120, one or more water sprayers pumps 122, a main water tank 124, a water compensation system 126, one or more water sprayers filters 128, the one or more thermoelectric modules 130, a heat sink 132, a heat sink Fan 134, a flat belt 136, a rubber blade 138, a electromotor gear box 140, a recycled water watercourse 142, and a expansion vessel 144.

The air conditioner system 100 further includes a Deodorizer Spray 146, a Deodorizer Nozzle 148, a Deodorizer Actuator 150, the outgoing air heat exchanger 152, a Drinking Water Tank 154, a Drinking Water Circulating Pump 156, a Drinking Water Dispenser Pump 158, a Drinking Water Dispensing Nozzle 160, one or more Temperature Sensors 162, one or more Relative Humidity Sensors 164, an Excessive Sprayed Water Watercourse 166, and the microcontroller unit.

The air conditioner system 100 includes a chamber 102 in which the one or more components are installed and assembled. The chamber 102 is made up of mechanically resistant, anticorrosion, and light materials with low heat conduction coefficient. The lower tray 104 is located in the lower section of the chamber 102 and is used for collecting the excessive water sprayed. The lower tray 104 is made up of same material used for manufacturing the chamber 102. Further in the lower section of the chamber 102, the plurality of blades 106 are installed which are used for the intake of air in to the chamber 102.

The plurality of blades 106 is made of same material that is used for manufacturing the chamber 102. In the input section of air, the plurality of air filters 108 are placed and they are made up of nano-silver and active carbon materials that are used for removing floating particles, smell, and microorganisms from the air. The main ventilator 110 sucks the external air to the inside of the chamber 102 through the plurality of air filters 108 and the blades 106.

In the upper section of the chamber 102, the outgoing air heat exchanger 152 is installed next to the main ventilator 110. The heat exchangers fins are made up of metals with high thermal conductivity coefficient such as copper or aluminum or their alloys. The narrow pipes of the heat exchangers are made up of stainless steel. The main ventilator 110 conducts the conditioned air from the chamber 102 via the heat exchanger through the common conducting duct to the target environment.

The one or more water sprayer pumps 122 suck the water from the water tank 124 and sprays water over the pipes and fins of the one or more wet heat exchangers 112. The one or more water sprayers 120 spray the water on one or more wet heat exchangers 112 that are far from the air intake ports and the plurality of blades 106. The one or more heat exchangers that are close to the air intake ports positioned before the wet heat exchangers 112 are the dry heat exchangers 114.

The one or more dry heat exchangers 114 and the one or more wet heat exchangers 112 are placed in the path of input air in a serial form. A liquid is circulated inside the pipes of the one or more heat exchangers. The liquid that is circulated in the pipes is the water and ethylene glycol solution. The operation selection valves 118 operates simultaneously and change the path of circulating water-ethylene glycol solution flow in the heat exchanger pipes depending on the operation of the air conditioner system 100 in the cooling or the heating mode.

The expansion vessel 144 is placed in the outgoing path of the one or more dry heat exchangers 114 to the solution circulating pump 116 and compensates volume changes of the water ethylene glycol solution.

The upper section of the chamber 102 also holds the one or more thermoelectric modules 130. The thermoelectric modules 130 are used to pump the heat from the internal space of the chamber 102 to outside of the air conditioner system 100. The external surface of the thermoelectric modules 130 is hot and is cooled through the heat sink 132 that is equipped with the heat sink fan 134. The heat sink 132 is made up of metals with high thermal conductivity coefficient. The hot air around heat sink fins is ventilated through the electrical fan to the outside circumference.

The cold surface of the one or more thermoelectric modules 130 is cleaned continuously by the rubber blade 138 which is installed over the flat belt 136. The flat belt 136 rotates around two small rollers made up of stainless steel. The driver roller is rotated by the electromotor gearbox 140. The rubber blade 138 sweeps the cold surface of the one or more thermoelectric modules 130 and collects the water drops which are condensed. Further the recovered water returns to the main water tank 124 through the recycled water Watercourse 142.

The drinking water circulating pump 156 circulates the drinking water through the outgoing air heat exchanger 152 and the drinking water tank 154. The Drinking Water Dispenser Pump 156 pumps the drinking water from the drinking water tank 154 to the drinking water dispenser nozzle 160. The deodorized and disinfection liquid is sprayed inside the chamber 102 through the outlet nozzle. The spraying action is performed by pressing the sprayer nozzle by the deodorizer actuator 150.

In regular intervals, an electrical command results in spraying a whole rate of deodorizer and disinfector solution inside the chamber 102 of the air conditioner system 100. The sprayed liquid is transferred along with airflow through outlet duct to the target environment and deodorizes and disinfects the environment. Further, even when the air conditioner system 100 is not operated, the microcontroller unit 168 turns on the main ventilator 110 in pre-determined intervals and sprays the solution to the inside of the target environment.

The microcontroller unit 168 controls the air conditioner system 100 for achieving high performances and also minimizes the water and energy consumption to operate the air conditioner system 100. The one or more temperature sensors 162 and relative humidity sensors 164 measure the temperature and relative humidity of the input and the output air. Further the temperature of the internal and external plates of the thermoelectric modules 130 and the temperature of the water circulated through the heat exchangers are also measured by the one or more temperature sensors 162.

The data measured by the one or more temperature 162 and relative humidity sensors 164 is sent to the microcontroller unit 168. The microcontroller unit 168 further compares the measured data with the preset values that are set by the user. The microcontroller unit 168 then sends the commands to the one or more component such as the electric spraying pumps 122, the circulating water pump 116, the drinking water dispenser pump 158, the drinking water circulating pump 156, the one or more thermoelectric modules 130, the heat sink fan 134, the deodorizer actuator 150 and the main ventilator 110.

The microcontroller unit 168 also controls the rotating speed of the main ventilator 110 fans and cooling rate of the one or more thermoelectric modules 130. The rotation speed of the main ventilator 110 and the cooling rate of thermoelectric modules 130 are controlled linearly such that the microcontroller unit 168 is able to adjust their working according to the air conditioning requirements. The microcontroller unit 168 also controls the rotating speed of the main ventilator 110 fans and cooling rate of the one or more thermoelectric modules 130 by the pulse width modulation (PWM) method through power circuits.

The microcontroller unit 168 is also equipped with one or more touch control switches for adjusting the preset values of temperature and relative humidity and also for setting up the various parameters associated with the working of the air conditioner system 100. The microcontroller unit 168 also includes a LCD screen for displaying the current air conditioner status and the measured values of the current temperature and relative humidity. The microcontroller unit 168 is programmed by a software program that controls the one or more components of the air conditioner system 100 to provide the desired temperature and relative humidity set by the user. The microcontroller unit 168 also measures the water ethylene glycol solution temperature, the temperature of the internal and external plates of the thermoelectric modules and incoming and outgoing air temperature and their relative humidity to adjust air conditioner working conditions.

In heating mode, if temperature of the water-ethylene glycol solution (Tc) exceeds over a temperature of 45° C., then the air conditioner system 100 is ready for heating the air. The heating of the air causes a decreasing of the relative humidity of processed air. If the relative humidity (Hin) of the incoming air decreases below the preset relative humidity (Hp), then the microcontroller unit 168 compensates the relative humidity by spraying water over one of heat exchangers.

The air conditioner system 100 utilizes the computerized control system to manage the working of various components in the air conditioner systems. The output signals of the temperature sensors 162 and relative humidity sensors 164 are digitized by analog to digital converter (ADC) of the microcontroller unit 168. Further the data is used as a feedback for real time controlling of temperature and relative humidity. The one or more components such as the water sprayer pumps 122, the solution circulation pump 116, and the heat sink fan 134 of thermoelectric modules, the drinking water circulation pump 156, and the drinking water dispenser pump 158 are controlled by the simple digital outputs of the microcontroller unit 168 as on/off method.

Consider an example, in which the user turns on the air conditioner system 100, the preset temperature (Tp) and the relative humidity (Hp) should be adjusted in the air conditioner system 100. The preset adjustment is saved in the memory of the microcontroller unit 168. Further when the user turns on the air conditioner system 100 second time, the previous preset values are displayed and used by the microcontroller unit 168, otherwise the user should adjust the new preset values for temperature & relative humidity.

The microcontroller unit 168 turns on the main ventilator 110 in the lowest speed to suck the circumference air in to the air conditioner system 100. The microcontroller unit 168 then reads the current temperature (Tin) and the relative humidity (Hin) of the input air through the one or more temperature sensors 162 and relative humidity sensors 164. The microcontroller unit 168 then compares the current temperature (Tin) of the input air with the preset temperature (Tp) and if the current temperature is greater than preset value, the air conditioner system 100 operates in the cooling mode as shown in FIG. 2. Further if the preset temperature is greater than current value, the air conditioner system 100 operates in the heating mode as shown in FIG. 3. The optimum temperature and relative humidity of the outgoing air is achieved automatically in the air conditioner system 100 with a higher efficiency resulting in the reduced use of energy and water.

In the cooling mode, the air passing through the fins of the one or more wet heat exchangers 112 is chilled due to evaporation of the water sprayed over the narrow pipes and fins of the one or more wet heat exchangers 112. Further the liquid passing through the one or more wet exchangers 112 pipes is also chilled. The liquid is the water-ethylene glycol solution. The selection valves 118 further leads the water-ethylene glycol solution to the path in which the solution circulating pump 116 circulates the liquid through a closed circuit.

The water ethylene glycol solution chilled in the one or more wet heat exchangers 112 also chills the air passing through the fins of one or more dry heat exchangers 114. The action helps the air passing through the one or more dry heat exchangers 114 to lose some of its heat without any need of water evaporation. Further by supplying electrical source to the one or more thermoelectric modules 130, the heat will be transferred from one ceramic surface to another surface based on Peltier effect due to which one surface of the thermoelectric module is chilled and another surface is heated. The external surface of the one or more thermoelectric modules 130 is hot and is cooled through a heat sink 132 which is equipped with the heat sink fan 134.

Further an inconsiderable rate of water which is sprayed over the wet heat exchangers passes across the one or more thermoelectric modules 130 along with the airflow and in the form of very fine drops. The fine drops are entrapped over fins of the outgoing air heat exchanger 152. Due to evaporation of these fine drops of water, the temperature of outgoing air and surface of heat exchanger fins and narrow pipes is reduced again considerably. The drinking water circulating pump 156 circulates the drinking water through the outgoing air heat exchanger 152 and the drinking water tank 154. Drinking water is cooled during circulation through outgoing heat exchanger. The Drinking Water Dispenser Pump 156 pumps the drinking water from the drinking water tank 154 to the drinking water dispenser nozzle 160.

The air conditioner system 100 operates in the cooling mode in various stages. In the cooling mode, the air passing through the air conditioning system 100 will be cooled in four stages.

In the first stage, the air is passed through the one or more dry heat exchangers 114 and the cooling source in the first stage is the water evaporated over pipes 20 and fins of one or more wet heat exchangers 112. Further the air passing through the fins of one or more wet heat exchangers 112 are chilled and also the liquid passing through the pipes of the wet heat exchangers 112 is cooled due to evaporation of the water sprayed over the narrow pipes and fins of the wet heat exchangers 112. In cooling mode, the selection valve 118 leads the water-ethylene glycol solution to the path in which the solution circulating pump 116 circulates water-ethylene glycol solution through a closed circuit. The water ethylene glycol solution is chilled in the one or more wet heat exchangers 112 and also the air passing through the fins of one or more dry heat exchangers 114 is chilled.

In the second stage, the air is passed through the one or more wet heat exchangers 112 and the cooling source in the second stage is the water evaporated over pipes and fins of the one or more wet heat exchangers 112. Further in this stage, the evaporated water is sprayed over narrow pipes and fins of the one or more wet heat exchangers 112 and the air is chilled by passing through the fins of wet heat exchangers. The air that is pre-cooled while passing through the one or more dry heat exchangers 114 evaporates less water.

In the third stage, the air is confronted with the one or more thermoelectric modules 130 and the cooling source in the third stage is the electrical energy that is used in the thermoelectric modules 130. The air experienced moisture increases and temperature loss in the previous stages reaches the upper section of the chamber of the air conditioner system that holds the one or more thermoelectric modules 130. By supplying electrical power to the one or more thermoelectric modules 130, the heat will be transferred from one ceramic surface to another surface based on Peltier Effect due to which one surface of the thermoelectric module is chilled and another surface is heated. The external surface of the one or more thermoelectric modules 130 is hot and is cooled through a heat sink 132 which is equipped with the heat sink fan 134. In the fourth stage, the air is passed through the outgoing air heat exchanger 152 and the cooling source in the fourth stage is the evaporation of fine water drops that are present in the outgoing air stream over pipes and fins of the outgoing air heat exchanger 152. Further an inconsiderable rate of water which is sprayed over the wet heat exchangers passes across the one or more thermoelectric modules 130 along with the airflow and in the form of very fine drops. The fine drops are entrapped over fins of the outgoing air heat exchanger 152. Due to evaporation, the temperature of outgoing air and surface of heat exchanger fins and narrow pipes is reduced again considerably.

The operation selection valve 118 is used for changing the operation of the air conditioner system 100 in the cooling mode or the heating mode based on the temperature of input air.

In the heating mode, the operation selection valve 118 conducts the water-ethylene glycol solution to the path in which it is heated through the external heating source. For example, the external heating source is a car engine or a central heating system in a building. The heated water in the air conditioner system 100 passes through the narrow pipes of the one or more wet heat exchangers 112 and the one or more dry heat exchangers 114 and the air passed through the fins will be heated. In the heating mode, when the relative humidity of the outgoing air is less than the ideal rate, the humidity is increased by spraying water over the one or more wet heat exchangers.

The air conditioner system 100 also can use an external electrical water heater and circulating pump for providing hot water during the heating mode. The various heating sources that are used include natural gas, gas oil, and gasoline for heating the water ethylene glycol solution.

The various advantages of the embodiment herein are that the air conditioner system can be used in buildings, cars, vehicles and camps. Further the air conditioner system consumes less water and energy and is operated with at a low cost. The installation of the air conditioner system also requires less time and low cost. A portion of the consumed water is also recycled in the air conditioner system. The air conditioner system also does not need the direct energy of the vehicle engine for cooling and heating operations and the air conditioner system operates when the engine is switched off. Further automatic adjustment of cooling/heating function is achieved in the air conditioner system and is compact in design requiring less amount of space for installation and use.

The other advantages are that the air conditioner system disclosed herein has a unique air duct for warm and cold conditioned air. Further the air conditioner system filters and removes the floating particles, smell, and microorganisms from the conditioned air. The air conditioner system also deodorizes and disinfects the conditioned air to provide a good smelling, sweet and hygienic air.

The foregoing description of the embodiments herein will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An air conditioner system comprising:
a chamber;
a plurality of blades installed in the chamber to input air to the chamber;
a plurality of air filters arranged at an entrance section of each of the plurality of blades, and wherein the plurality of air filters is made up of nano-silver and activated carbon materials for removing floating particles, smell and microorganisms in air;
an electrical ventilator to suck the air through the plurality of air filters and the plurality of the blades;
one or more dry heat exchangers installed in the chamber;
one or more wet heat exchangers installed in the chamber;
an outgoing air heat exchanger;
an operation selection valve, wherein the operation selection valve changes a water-ethylene glycol solution circulating flow path based on a cooling mode and/or a heating mode;
an electrical circulating pump for circulating the water-ethylene glycol solution;
one or more water sprayer pumps;
one or more water filters;
one or more sets of water sprayer nozzles, wherein the one or more water sprayer pumps circulate water through the one or more water filter to the one or more sets of water sprayer nozzles;
one or more thermoelectric modules, wherein the one or more thermoelectric modules is configured to pump heat from an internal space of the chamber to an outside environment, and wherein a plurality of wiper blades cleans a cold surface of the one or more thermoelectric modules;
at least one temperature sensor inside the chamber; and
at least one relative humidity sensor inside the chamber for sensing conditions relative to the chamber;
one cold drinking water circulating pump;
one cold drinking water dispenser pump, and wherein the cold drinking water dispenser pump delivers cold drinking water through a drinking water dispenser nozzle to a user in cars, vehicles and camps;
a deodorizer and disinfector spray system, wherein the deodorizer and disinfector spray system deodorizes and disinfects a conditioned air; and
a microcontroller unit, wherein the microcontroller unit comprises one or more preset values for temperature and relative humidity, and wherein the one or more preset values for temperature and relative humidity is set by a user, and wherein air passed through the chamber is automatically controlled by the microcontroller unit based on an operation of the system in the cooling mode or the heating mode, and wherein the air is cooled in the cooling mode by passing the air through the one or more dry heat exchangers, one or more wet heat exchangers, the one or more thermoelectric modules and the outgoing air heat exchanger using a multistage water evaporation mechanism, and wherein the multistage water evaporation mechanism includes a first stage, a second stage, a third stage and a fourth stage, and wherein the air is heated in the heating mode by passing the air through a plurality of narrow pipes in the one or more dry heat exchangers, and wherein the microcontroller activates the deodorizer and disinfector spray system to spray a deodorizer and disinfector spray solution to an inside of a target environment in a predetermined interval, even when the air-conditioner system is not operated.

2. The air conditioner system of claim 1, wherein a predetermined amount of liquid present in a plurality of narrow pipes in the one or more wet heat exchangers is used as a medium in the cooling mode and wherein a predetermined amount of liquid present in the plurality of the narrow pipes in the one or more dry heat exchangers is used as a medium in the heating mode.

3. The air conditioner system of claim 1, wherein the air passing through the one or more dry heat exchangers is cooled by a predetermined amount of the water ethylene glycol solution which circulates through a plurality of narrow pipes in the one or more wet heat exchangers and in the one or more dry heat exchangers, and wherein the air is subjected to a cooling process by the water being sprayed and evaporated over the plurality of narrow pipes and a plurality of fins in the one or more wet heat exchangers, in the first stage of the multistage water evaporation mechanism.

4. The air conditioner system of claim 1, wherein the air passing through the one or more wet heat exchangers is cooled by spraying and evaporating the water over the plurality of narrow pipes and a plurality of fins of the one or more wet heat exchangers in the second stage of the multistage water evaporation mechanism.

5. The air conditioner system of claim 1, wherein the air confronting the one or more thermoelectric modules is cooled by Peltier effect using electrical energy that is consumed in the one or more thermoelectric modules in the third stage of the multistage water evaporation mechanism.

6. The air conditioner system of claim 1, wherein the air passing through the outgoing air heat exchanger is cooled by entrapping and evaporation of fine water drops present in an outgoing air stream over a plurality of narrow pipes and a plurality of fins of the outgoing air heat exchanger in the fourth stage of the multistage water evaporation mechanism.

7. The air conditioner system of claim 1, wherein the at least one temperature sensor measures a temperature of input and output air, a temperature of internal plates and external plates of the one or more thermoelectric modules and a temperature of water circulating in the air conditioner system.

8. The air conditioner system of claim 1, wherein the at least one relative humidity sensor measures a relative humidity of input air and output air.

9. The air conditioner system of claim 1, wherein the electrical circulating pump circulates a water-ethylene glycol solution in a closed circuit through the one or more dry heat exchangers and the one or more wet heat exchangers in the cooling mode.

10. The air conditioner system of claim 9, wherein the operation selection valve conducts the water-ethylene glycol solution to a path that is heated through an external heating source during the heating mode.

11. The air conditioner system of claim 1, wherein the microcontroller unit turns on the electrical circulating pump and sprays water over the one or more wet heat exchangers in regular intervals based on preset values for temperature and relative humidity set by a user during the cooling mode.

12. The air conditioner system of claim 1, wherein the cooling mode or the heating mode is selected automatically based on the temperature of the input air.

13. The air conditioner system of claim 1, wherein the one or more wet heat exchangers are made up of one or more metals.

14. The air conditioner system of claim 1, wherein the one or more dry heat exchangers are made of one or more metals.

15. The air conditioner system of claim 1, wherein a predetermined amount of the drinking water is cooled during a circulation of the drinking water through the outgoing heat exchanger in the cooling mode, and wherein the predetermined amount of the cooled drinking water is delivered through the cold drinking water dispenser pump from a drinking water tank to the drinking water dispenser nozzle.

* * * * *